(12) United States Patent
Feng et al.

(10) Patent No.: US 9,791,626 B2
(45) Date of Patent: Oct. 17, 2017

(54) LIGHT TRANSMITTING SUBSTRATE, ARRAY SUBSTRATE, COLOR FILTER SUBSTRATE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: He Feng, Beijing (CN); Hongjiang Wu, Beijing (CN); Sikai Zhang, Beijing (CN); Changgang Huang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/435,994

(22) PCT Filed: Aug. 15, 2014

(86) PCT No.: PCT/CN2014/084555
§ 371 (c)(1),
(2) Date: Apr. 15, 2015

(87) PCT Pub. No.: WO2015/043331
PCT Pub. Date: Apr. 2, 2015

(65) Prior Publication Data
US 2015/0268420 A1    Sep. 24, 2015

(30) Foreign Application Priority Data
Sep. 27, 2013  (CN) .......................... 2013 1 0452663

(51) Int. Cl.
*G02B 6/26* (2006.01)
*G02F 1/1335* (2006.01)
(Continued)

(52) U.S. Cl.
CPC ............. *G02B 6/264* (2013.01); *G02B 5/201* (2013.01); *G02B 6/12007* (2013.01);
(Continued)

(58) Field of Classification Search
CPC .......................... G02B 6/12004; G02B 6/3502
See application file for complete search history.

(56) References Cited

U.S. PATENT DOCUMENTS 5,377,026 A     12/1994  Liu et al.
5,566,261 A *   10/1996  Hall ...................... G11C 21/00
                                                                  372/21
(Continued)

FOREIGN PATENT DOCUMENTS

CN    101573658 A    11/2009
CN    101629824 A    1/2010
(Continued)

OTHER PUBLICATIONS

Second Chinese Office Action Appln. No. 201310452663.2; Dated Nov. 11, 2015.
(Continued)

*Primary Examiner* — Sung Pak
*Assistant Examiner* — Hoang Tran
(74) *Attorney, Agent, or Firm* — Ladas & Parry LLP

(57) ABSTRACT

Disclosed are a light transmitting substrate, an array substrate, a color filter substrate and a display device. The light transmitting substrate includes a substrate body (10) comprising at least one intensifier layer (11) and at least one micro-ring resonate structure with a gain located in the intensifier layer (11). By arranging micro-ring resonate structure(s) with a gain in the substrate body (10), the light incident on the substrate is intensified upon passing through the micro-ring resonate structure so as to increase the intensity of the incident light.

9 Claims, 4 Drawing Sheets

(51) Int. Cl.
*G02B 5/20* (2006.01)
*G02B 6/12* (2006.01)
*G02B 6/293* (2006.01)

(52) U.S. Cl.
CPC ... *G02B 6/29343* (2013.01); *G02F 1/133514* (2013.01); *G02F 1/133611* (2013.01); *G02F 2203/15* (2013.01)

(56) References Cited

U.S. PATENT DOCUMENTS

| | | | |
|---|---|---|---|
| 2003/0194165 A1 | 10/2003 | Silberberg et al. | |
| 2006/0056760 A1* | 3/2006 | Djordjev | G02B 6/12 |
| | | | 385/15 |
| 2006/0198415 A1* | 9/2006 | Yamazaki | G02B 6/12 |
| | | | 372/94 |
| 2006/0222286 A1* | 10/2006 | Spoonhower | G02B 6/12 |
| | | | 385/15 |
| 2008/0159683 A1 | 7/2008 | Smith et al. | |

FOREIGN PATENT DOCUMENTS

| | | |
|---|---|---|
| CN | 102495480 A | 6/2012 |
| CN | 103178951 A | 6/2013 |
| CN | 103487985 A | 1/2014 |
| KR | 20020041053 A | 6/2002 |

OTHER PUBLICATIONS

International Search Report Appln. No. PCT/CN2014/084555; Dated Nov. 18, 2014.
Written Opinion of the International Searching Authority Appln. No. PCT/CN2014/084555; Dated Nov. 18, 2015.
First Chinese Office Action Appln. No. 201310452663.2; Dated Jun. 30, 2015.

* cited by examiner

LIGHT TRANSMITTING SUBSTRATE, ARRAY SUBSTRATE, COLOR FILTER SUBSTRATE AND DISPLAY DEVICE

TECHNICAL FILED

Embodiments of the present invention relate to a light transmitting substrate, an array substrate, a color filter substrate and a display device.

BACKGROUND

Liquid crystal display (LCD) is widely used in consumption electronic products such as mobile phone, laptop, display and TV set and has become a dominating display product replacing conventional displays based on cathode-ray tube for its advantages such as excellent display quality, smaller size, lighter weight and broader application.

The LCD is usually manufactured by a cell-assembly process of an array substrate and a color filter (CF) substrate which both require for preparing a substrate from a light transmitting material (such as glass and resin) and integrating display components on the substrate.

In order to improve the brightness of the LCD, it needs to reduce an area occupied by the display components or increase the brightness of a back-light source. However, these measures often negatively influence the performance of the LCD.

SUMMARY

Embodiments of the present invention provide a light transmitting substrate, an array substrate, a color filter substrate and a display device to improve display brightness without influencing display performance.

On one aspect, at least one embodiment of the present invention provides a light transmitting substrate comprising a substrate body; the substrate body comprises at least one intensifier layer and at least one micro-ring resonator structure with a gain located in the intensifier layer.

For example, in an embodiment of the present invention, the micro-ring resonator structure comprises a straight waveguide and a resonator ring.

For example, in an embodiment of the present invention, the micro-ring resonator structure is embedded within the substrate body.

For example, in an embodiment of the present invention, the micro-ring resonator structure is located at a surface of the substrate body.

For example, in an embodiment of the present invention, a plurality of micro-ring resonator structures are arranged in the light transmitting substrate.

For example, in an embodiment of the present invention, the substrate body contains a material of glass, resin or quartz.

On another hand, at least one embodiment of the present invention further provides an array substrate comprising any one of the above light transmitting substrates.

On still another hand, at least one embodiment of the present invention further provides a color filter substrate comprising any one of the above light transmitting substrates.

For example, in an embodiment of the present invention, respective micro-ring resonator structures corresponding to color pixel layers of different colors in a single pixel unit of the color filter substrate have different sizes.

For example, in an embodiment of the present invention, the color pixel layers comprise at least a red pixel layer, a green pixel layer and a blue pixel layer.

For example, in an embodiment of the present invention, the micro-ring resonator structure corresponding to the red pixel layer has a size matched with a wavelength of a red light wave; the micro-ring resonator structure corresponding to the green pixel layer has a size matched with a wavelength of a green light wave; and the micro-ring resonator structure corresponding to the blue pixel layer has a size matched with a wavelength of a blue light wave.

On yet another hand, at least one embodiment of the present invention further provides a display device comprising any one of the above array substrates; and/or; any one of the above color filter substrates.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

The inventors have noted that technical problems relating to improve display brightness without influencing display performance.

First Embodiment

Figure 1:
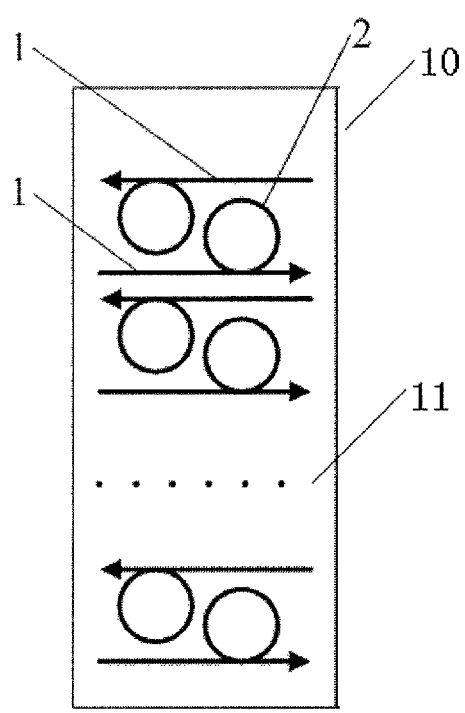
FIG. 1 is a schematic diagram illustrating a structure of a light transmitting substrate according to a first embodiment of the present invention.

As illustrated in FIG. 1, a light transmitting substrate as provided by an embodiment of the present invention comprises a substrate body (base substrate) 10, the substrate body 10 comprises at least one intensifier layer 11, and the intensifier layer 11 comprises at least one micro-ring resonator structure with a gain.

By arranging at least one intensifier layer 11 on the substrate body 10, the light incident on the substrate is intensified upon passing through the micro-ring resonator structure in the intensifier layer. In this way, an intensity of the incident light can be considerably increased so as to improve product quality.

For example, in an embodiment of the present invention, the micro-ring resonator structure can be a single micro-ring resonator structure comprising a straight waveguide 1 and a resonator ring 2.

Of course, the micro-ring resonator structure can be arranged in other forms, apart from the single micro-ring resonator structure.

For example, in the light transmitting substrate as provided by an embodiment of the present invention, the micro-ring resonator structure can be formed by an etching process within the substrate body or formed by an etching process at a surface of the substrate body, depending on actual demands.

For example, in practical application, a plurality of micro-ring resonator structures can be formed in the intensifier layer 11, and the plurality of micro-ring resonator structures are distributed in groups such that each group includes two micro-ring resonator structures arranged in opposite to each other. For example, these two micro-ring resonator structures can be arranged in opposite to each other by way of aligning a tail portion of one micro-ring resonator structure with a head portion of the other micro-ring resonator structure. In this way, a space occupied by the micro-ring resonator structures can be reduced so as to considerably increase the number of micro-ring resonator structures given a limited space.

Besides, in order to increase the light intensity, a plurality of intensifier layers can be arranged in an embodiment of the present invention. For example, forming one layer or multiple layers of micro-ring resonator structure(s) by etching process below the initially formed micro-ring resonator structure(s).

For example, the substrate body as provided by an embodiment of the present invention can contain a material such as glass, resin, quartz, or other light transmitting materials.

Figure 2:
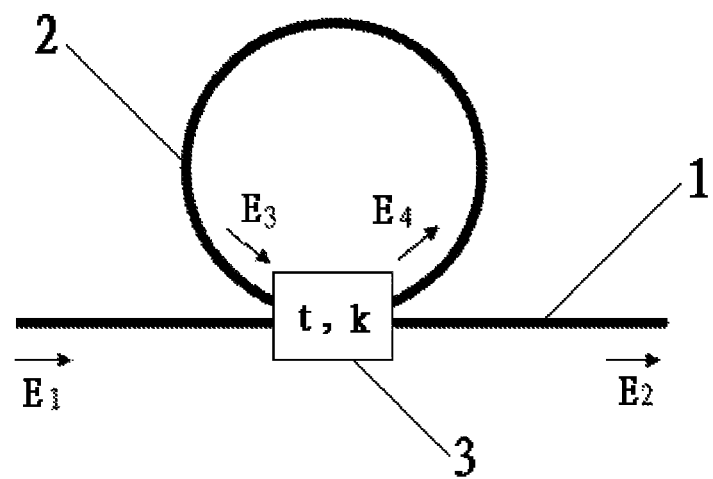
FIG. 2 is a schematic diagram illustrating a structure of a single micro-ring resonator structure according to the first embodiment of the present invention.

The above micro-ring resonator structure in the light transmitting substrate operates with a principle as illustrated in FIG. 2. Light waves with an optical filed of $E_1$ input from an end of the straight waveguide 1 have part of energy thereof coupled into the resonator ring 2 upon passing through a coupler 3, and finally are output with an optical filed of $E_2$ from the other end of the straight waveguide 1. The micro-ring resonator structure satisfies a resonating condition that an optical distance of the light wave in the resonator ring 2 is an integer multiple of a wavelength of the light wave; that is, $$2\pi Rn = m\lambda \quad (1).$$

Wherein, R denotes a radius of the resonator ring 2, n denotes an effective refractive index in the resonator ring 2, $\lambda$ denotes a resonance wavelength, and m denotes a resonance series. At both ends of the coupler, optical fields in the resonator ring 2 and in the straight waveguide 1 satisfy a relation as below:

$$E_2 = tE_1 + ikE_3 \quad (2)$$

$$E_4 = ikE_1 + tE_3 \quad (3)$$

Wherein, k, t denote a coupling coefficient and a transmission coefficient between the resonator ring 2 and the straight waveguide 1, respectively, and satisfy a condition of $k^2 + t^2 = 1$. Wherein, i represents that a cross coupling may generate an additional phase shift of $\pi/2$.

In addition, a lost or a grain may exist in the resonator ring 2, so there is $$E_3 = a\exp(i\varphi)E_4 \quad (4)$$

Wherein, $a = \exp(-\alpha L)$ represents a transfer coefficient of the resonator ring 2, a ring circumference L of the resonator ring 2 is $L = 2\pi R$, and a phase shift $\varphi$ of the light wave after transmitting in the resonator ring 2 for one circle is $\varphi = 2\pi nL/\lambda$. It can be determined from the above equations that an amplitude transfer function of a micro-ring resonator structure in which a single ring is coupled with a single straight waveguide is expressed as:

$$\tau = \frac{E_2}{E_1} = \frac{t - a\exp(i\varphi)}{1 - ta\exp(i\varphi)} \quad (5)$$

The intensity transmittance of the micro-ring resonator structure is expressed as:

$$T = |\tau|^2 = \left| \frac{t - a\exp(i\varphi)}{1 - ta\exp(i\varphi)} \right|^2. \quad (6)$$

Given a resonator ring 2 with a gain, a>1, then a relation expression of T>1 is demonstrated.

Second Embodiment

Embodiments of the present invention provide an array substrate comprising the light transmitting substrate as described in any of the above embodiments. By manufacturing an array substrate with such light transmitting substrate as a substrate, the light transmittance can be considerably increased and the performance of the array substrate can be improved.

Third Embodiment

Embodiments of the present invention provide a color filter substrate comprising the light transmitting substrate as described in any of the above embodiments.

For example, a color filter substrate as provided by an embodiment of the present invention comprises a light transmitting substrate and a plurality of pixel units formed on the light transmitting substrate; micro-ring resonator structures corresponding to color pixel layers of different colors in a single pixel unit have different sizes.

For example, the color pixel layers comprise at least a red pixel layer, a green pixel layer and a blue pixel layer; of course, the color pixel layers can also comprise a white pixel layer or a yellow pixel layer, etc.

Figure 3:
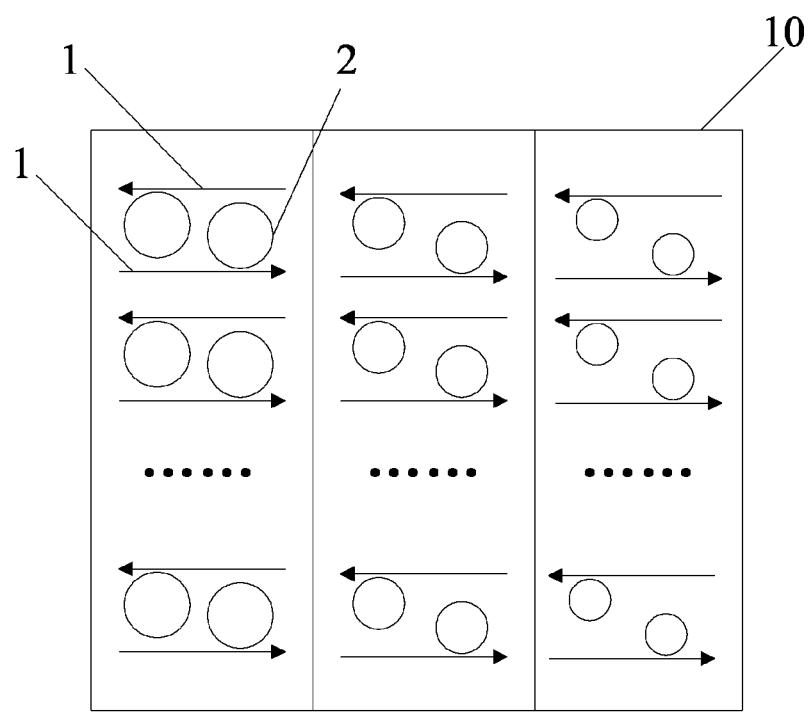
FIG. 3 is a top view illustrating a structure of a micro-ring resonator structure in a color filter substrate according to a third embodiment of the present invention.
Figure 4:
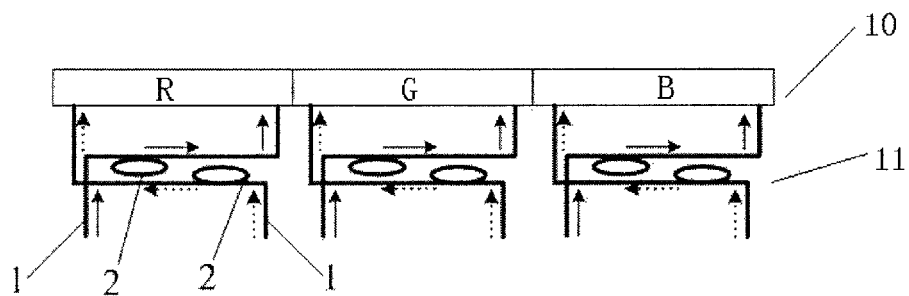
FIG. 4 is a sectional view illustrating the structure of the micro-ring resonator structure in the color filter substrate according to the third embodiment of the present invention.

FIG. 3 and FIG. 4 are a top view and a sectional view illustrating a structure of a micro-ring resonator structure in a color filter substrate according to a third embodiment of the present invention, respectively. The light passing through the color pixel layers R, G and B of red, green and blue colors becomes a red light wave, a green light wave and a blue light wave, respectively, thus radii of the respective resonator rings in the micro-ring resonator structures corresponding to the pixel layers with various colors are different in order to satisfy the resonating condition. For example, the micro-ring resonator structure corresponding to the red pixel layer R has a size matched with a wavelength of a red light wave; the micro-ring resonator structure corresponding to the green pixel layer G has a size matched with a wavelength of a green light wave; and the micro-ring resonator structure corresponding to the blue pixel layer B has a size matched with a wavelength of a blue light wave.

Figure 5:
FIG. 5 is a top view illustrating a straight waveguide of the micro-ring resonator structure according to the third embodiment of the present invention in a substrate body.
Figure 6:
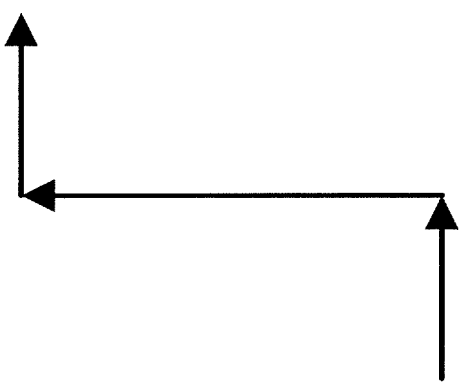
FIG. 6 is a sectional view illustrating the straight waveguide of the micro-ring resonator structure according to the third embodiment of the present invention in the substrate body and an internal light path of the straight waveguide.

FIG. 5 and FIG. 6 are a top view and a sectional view illustrating a straight waveguide of a micro-ring resonator structure in a substrate body according to the third embodiment of the present invention and an internal light path in the straight waveguide, respectively.

By means of the micro-ring resonator structure with a gain, the red, blue and green light waves satisfying the resonating condition from the light waves incident at a side of the substrate body are intensified respectively, so as to improve a transmittance of the substrate.

Figure 7:
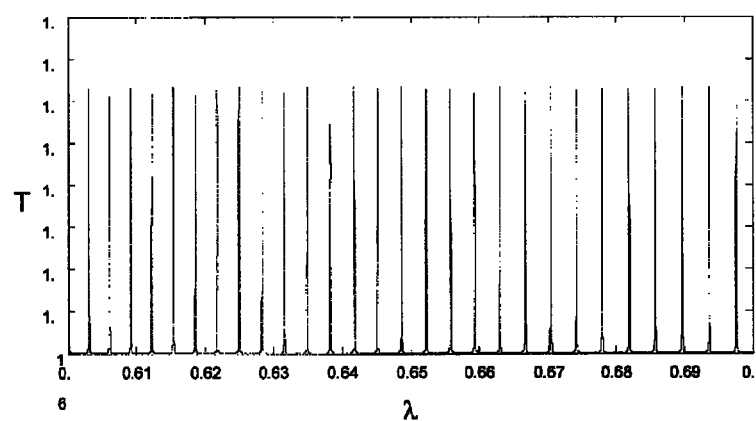
FIG. 7 is a diagram illustrating a light intensity transmittance versus a wavelength of light transmitting a red pixel layer.
Figure 8:
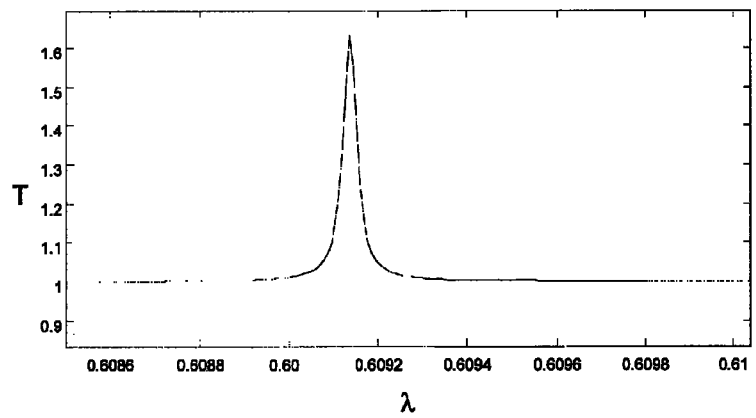
FIG. 8 is an enlarged view illustrating the light intensity transmittance in FIG. 7 at a waveband of 610 nm.

For the micro-ring resonator structure corresponding to the red pixel layer by way of example, FIG. 7 illustrates an intensity transmittance versus a wavelength of light passing through the red pixel layer, and FIG. 8 is an enlarged view illustrating an intensity transmittance at a waveband of 610 nm. In this case, a=1.005, t=0.96, n=1.5, L=80 µm.

Fourth Embodiment

Embodiments of the present invention provide a display device comprising the array substrate and/or the color filter substrate as described in any of the above embodiments.

For example, the display device as provided by an embodiment of the present invention can be any products or components having display function such as liquid crystal panel, digital paper, mobile phone, tablet PC, TV set, display, notebook, digital photo frame and navigator.

By arranging at least one intensifier layer on the substrate body, the display device as provided by embodiments of the present invention allows the light incident on the substrate to be intensified after passing through the intensifier layer. In this way, the intensity of incident light can be considerably increased so as to improve the product quantity.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention, and the protection scope of the invention should be defined by the claims.

The present application claims the priority of China patent application No. 201310452663.2 filed on Sep. 27, 2013, which is incorporated herein by reference in its entirely.

What is claimed is:

1. A light transmitting substrate comprising a substrate body, the substrate body comprises:
   at least one intensifier layer; and
   one a plurality of micro-ring resonate structures with a gain located in the intensifier layer,
   wherein each of the micro-ring resonate structures comprises a straight waveguide and a resonate ring which are coupled at a coupling end through a coupler such that a light wave input at an end of the straight waveguide has part of energy thereof coupled into the resonator ring at the coupling end and is output at the other end of the straight waveguide,
   wherein the micro-ring resonate structures are distributed in groups, and each group includes two micro-ring resonate structures which are arranged in opposite to each other such that the wave passes through the coupling ends in the two micro-ring resonate structures in opposite directions.

2. The light transmitting substrate of claim 1, wherein the micro-ring resonate structure is located at a surface of the substrate body.

3. The light transmitting substrate of claim 1, wherein the substrate body contains a material of glass, resin or quartz.

4. An array substrate comprising the light transmitting substrate of claim 1.

5. A color filter substrate comprising the light transmitting substrate of claim 1,
   wherein respective micro-ring resonate structures corresponding to color pixel layers of different colors in a single pixel unit of the color filter substrate have different sizes matched with wavelengths of light waves of respective colors.

6. The color filter substrate of claim 5, wherein the color pixel layers comprise at least a red pixel layer, a green pixel layer and a blue pixel layer.

7. The color filter substrate of claim 6, wherein the micro-ring resonate structure corresponding to the red pixel layer has a size matched with a wavelength of a red light wave;
   the micro-ring resonate structure corresponding to the green pixel layer has a size matched with a wavelength of a green fight wave; and
   the micro-ring resonate structure corresponding to the blue pixel layer has a size matched with a wavelength of a blue light wave.

8. The array substrate of claim 4, wherein the micro-ring resonate structure is located at a surface of the substrate body.

9. The color filter substrate of claim 5, wherein the micro-ring resonate structure is located at a surface of the substrate body.

* * * * *